United States Patent
Damnjanovic et al.

(10) Patent No.: US 9,451,635 B2
(45) Date of Patent: *Sep. 20, 2016

(54) METHODS AND APPARATUS FOR ACCESSING DORMANT CELLS

(71) Applicant: QUALCOMM Incorporated, San Diego, CA (US)

(72) Inventors: Aleksandar Damnjanovic, Del Mar, CA (US); Durga Prasad Malladi, San Diego, CA (US); Ajay Gupta, San Diego, CA (US); Peter Gaal, San Diego, CA (US); Wanshi Chen, San Diego, CA (US); Yongbin Wei, San Diego, CA (US); Tao Luo, San Diego, CA (US)

(73) Assignee: QUALCOMM Incorporation, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,259

(22) Filed: Apr. 17, 2015

(65) Prior Publication Data

US 2015/0223267 A1    Aug. 6, 2015

Related U.S. Application Data

(63) Continuation of application No. 14/181,580, filed on Feb. 14, 2014, now Pat. No. 9,014,143.

(60) Provisional application No. 61/767,218, filed on Feb. 20, 2013.

(51) Int. Cl.
*H04W 4/00* (2009.01)
*H04W 74/00* (2009.01)
(Continued)

(52) U.S. Cl.
CPC ........ *H04W 74/006* (2013.01); *H04J 11/0069* (2013.01); *H04L 5/0032* (2013.01);
(Continued)

(58) Field of Classification Search
CPC ............... H04L 2012/5608; H04W 84/12; H04W 88/08; H04W 80/04; H04W 88/06; H04W 84/18; H04W 36/18; H04W 36/0011; H04W 36/14; H04W 36/08
USPC ............... 370/310.2, 328, 331, 338, 349
See application file for complete search history.

(56) References Cited

U.S. PATENT DOCUMENTS 9,014,143 B2 *   4/2015   Damnjanovic ....... H04W 48/12 370/310.2
2008/0287129 A1 * 11/2008 Somasundaram    H04W 36/0055 455/436

(Continued)

OTHER PUBLICATIONS

"3rd Generation Partnership Project; Technical Specification Group Radio Access Network; Evolved Universal Terrestrial Radio Access (E-UTRA); Potential solutions for energy saving for E-UTRAN (Release 11)", 3GPP Standard; 3GPP TR 36.927, 3rd Generation Partnership Project (3GPP), Mobile Competence Centre ; 650, Route Des Lucioles ; F-06921 Sophia-Antipolis Cedex; France, vol. RAN WG3, No. V11.0.0, pp. 1-22, XP050649880, [retrieved on Sep. 22, 2012 ], paragraph [0006].

(Continued)

*Primary Examiner* — Brenda H Pham
(74) *Attorney, Agent, or Firm* — Arentz Fox LLP

(57) ABSTRACT

In an aspect of the disclosure, a method, a computer program product, and an apparatus are provided. The apparatus may be a first base station. The first base station transmits an information block to a UE while the UE is camped on a second base station. The information block includes an indication of a random access configuration for performing at least a part of a random access procedure. The first station performs, with the UE, at least a part of a random access procedure based on the indicated random access configuration.

24 Claims, 12 Drawing Sheets

(51) Int. Cl.
| | |
|---|---|
| *H04W 36/34* | (2009.01) |
| *H04W 74/08* | (2009.01) |
| *H04W 48/12* | (2009.01) |
| *H04W 52/02* | (2009.01) |
| *H04J 11/00* | (2006.01) |
| *H04L 5/00* | (2006.01) |
| *H04W 36/00* | (2009.01) |

(52) U.S. Cl.
CPC ........... *H04W 36/34* (2013.01); *H04W 48/12* (2013.01); *H04W 52/0206* (2013.01); *H04W 74/0833* (2013.01); *H04W 36/0077* (2013.01)

(56) References Cited

U.S. PATENT DOCUMENTS

| | | | |
|---|---|---|---|
| 2008/0318574 | A1 | 12/2008 | Bi |
| 2011/0216682 | A1 | 9/2011 | Xu et al. |
| 2011/0310747 | A1* | 12/2011 | Seo ..................... H04B 7/2606 370/246 |
| 2012/0015657 | A1 | 1/2012 | Comsa et al. |
| 2012/0163305 | A1 | 6/2012 | Nimbalker et al. |
| 2012/0207070 | A1* | 8/2012 | Xu ........................ H04W 48/20 370/311 |
| 2013/0100937 | A1 | 4/2013 | Fujita |
| 2014/0179320 | A1* | 6/2014 | Jang ...................... H04W 36/30 455/436 |
| 2014/0233530 | A1 | 8/2014 | Damnjanovic et al. |

OTHER PUBLICATIONS

International Search Report and Written Opinion—PCT/US2014/017191—ISA/EPO—Jul. 3, 2014.

NEC Group: "Small cell operation under macro coverage," 3GPP Draft; R1-130373 Small cell under Macro, 3rd Generation Partnership Project (3GPP), Mobile competence Centre; 650, Route Des Lucioles; F-06921 Sophia-Antipolis Cedex; France, vol. RAN WG1, No. St Julian; Jan. 28, 2013-Feb. 1, 2013, 3 pages, XP050663452, Retrieved from the Internet [retrieved on Jan. 18, 2013] the whole document.

QUALCOMM Incorporated: "Mechanisms for efficient small cell operation", 3GPP Draft, R1-130595 Mechanisms for Efficient Small Cell Operation, 3rd Generation Partnership Project (3GPP), Mobile Competence Centre, 650, Route Des Lucioles, F-06921 Sophia-Antipolis Cedex, FR, vol. RAN WG1, No. St. Julian, Malta, Jan. 28, 2013-Feb. 1, 2013 Jan. 19, 2013, XP050663851, pp. 1-3, Retrieved from the Internet: URL:http://www.3gpp.org/ftp/tsg_ran/WG1_RL1/TSGR1_72/Docs/.

\* cited by examiner

METHODS AND APPARATUS FOR ACCESSING DORMANT CELLS

CROSS-REFERENCE TO RELATED APPLICATION(S)

This application is a continuation, and claims the benefit, of U.S. patent application Ser. No. 14/181,580 entitled "METHODS AND APPARATUS FOR ACCESSING DORMANT CELLS" and filed on Feb. 14, 2014, which is expressly incorporated by reference herein in its entirety and itself claims the benefit of U.S. Provisional Application Ser. No. 61/767,218, entitled "ACCESSING DORMANT CELLS" and filed on Feb. 20, 2013, which is also expressly incorporated by reference herein in its entirety.

BACKGROUND

1. Field

The present disclosure relates generally to communication systems, and more particularly, to an access procedure for dormant cells.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a first base station. The first base station transmits an information block to a UE while the UE is camped on a second base station. The information block includes an indication of a random access configuration for performing at least a part of a random access procedure. The first station performs, with the UE, at least a part of a random access procedure based on the indicated random access configuration.

DETAILED DESCRIPTION

Figure 1:
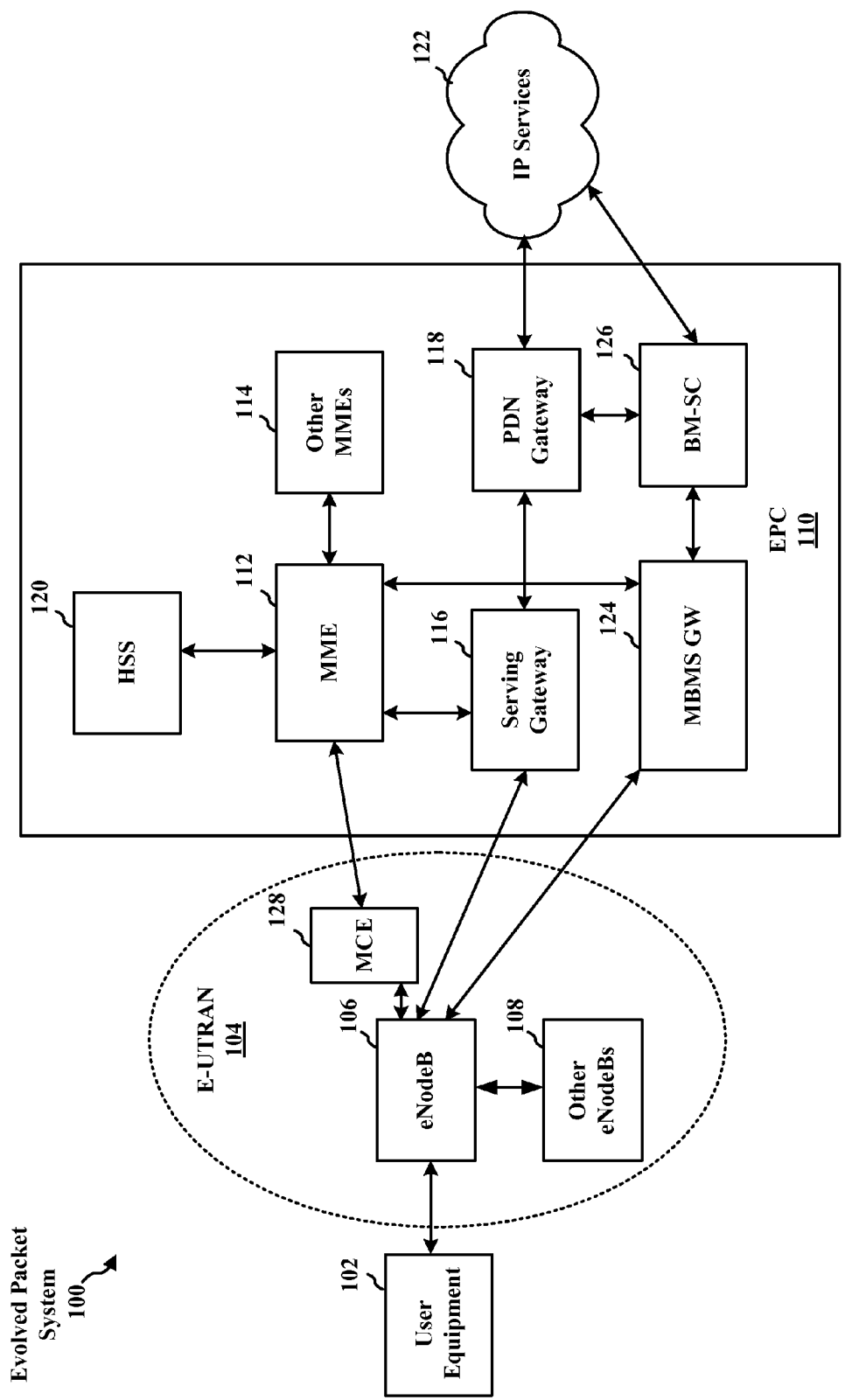
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
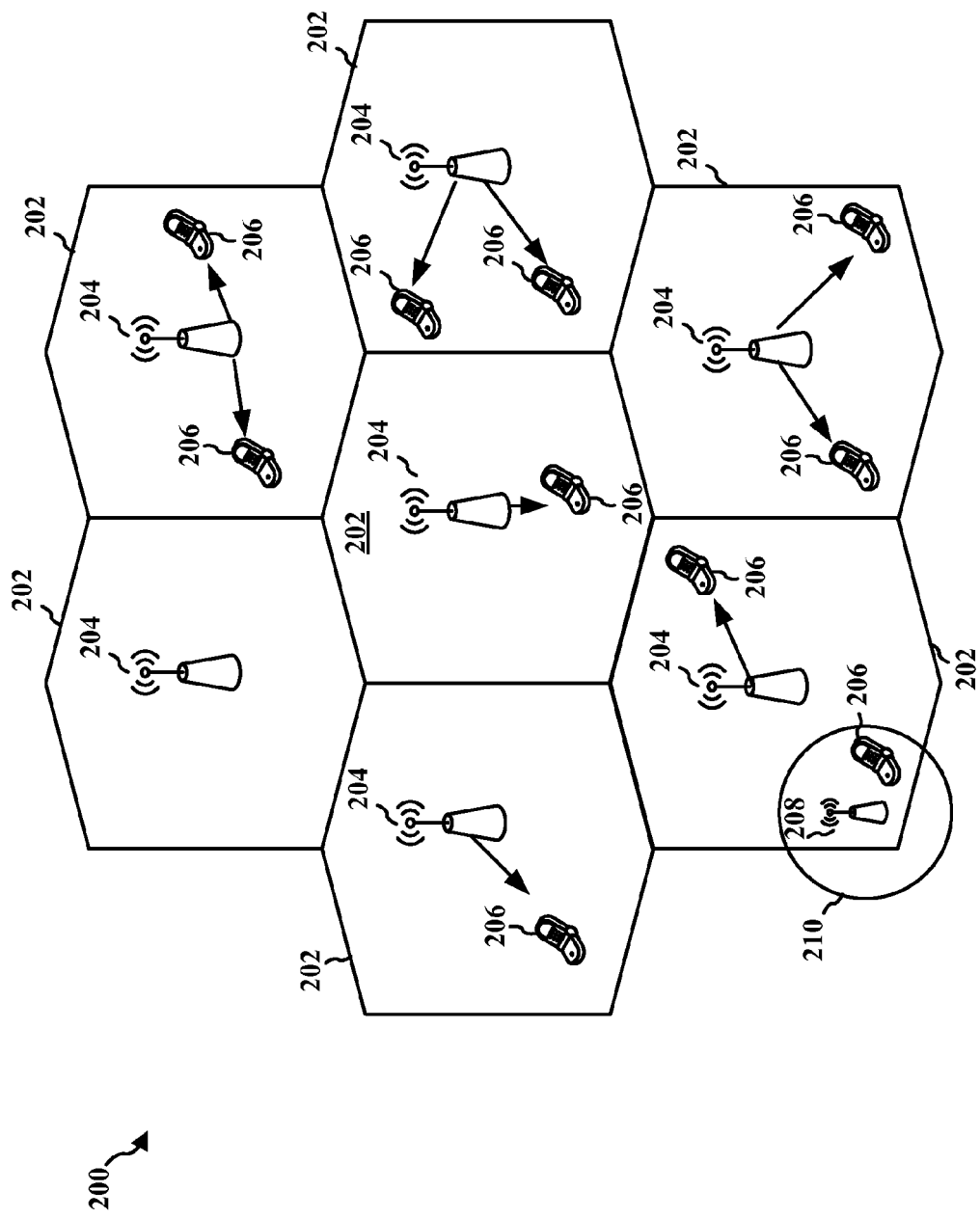
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques.

By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
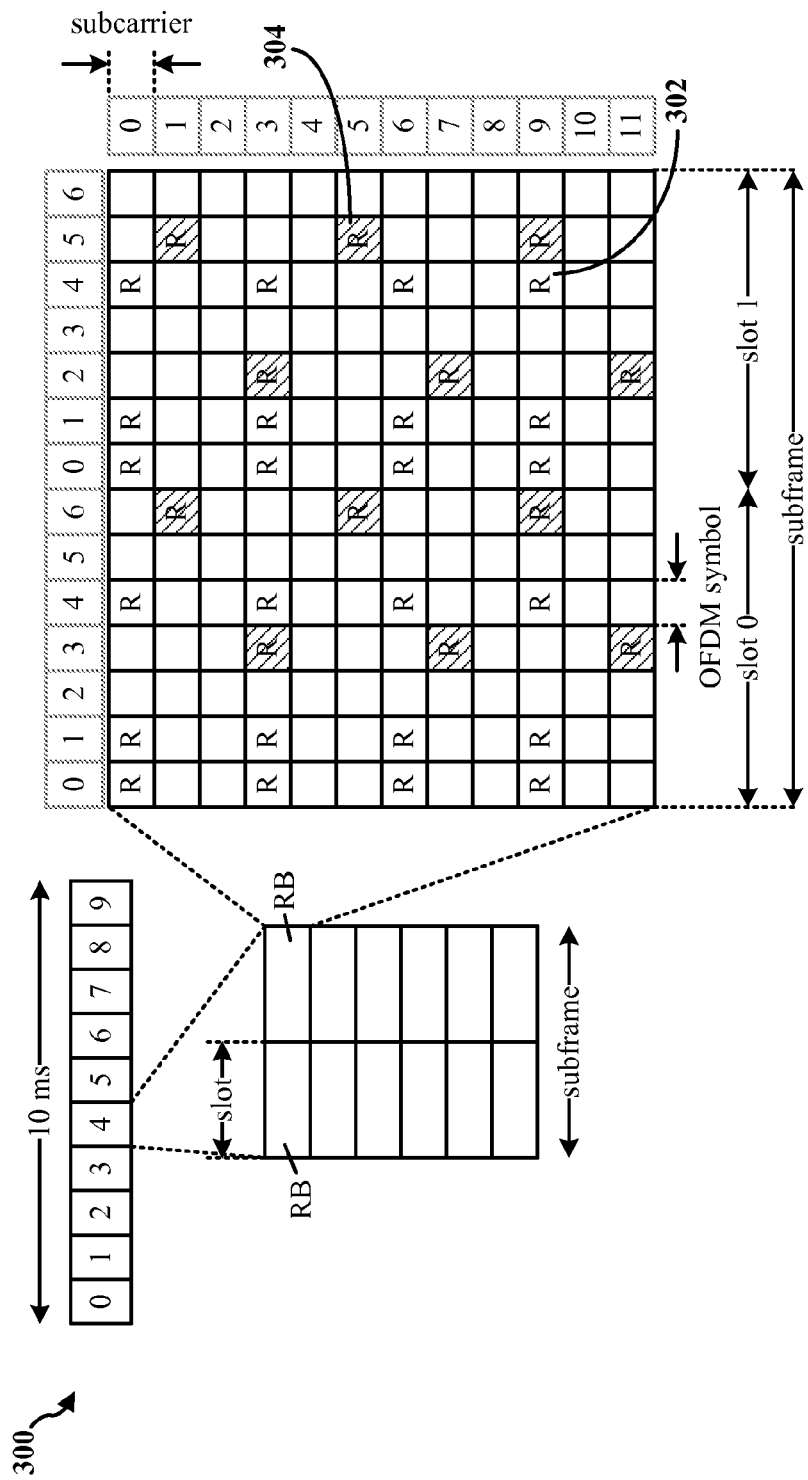
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 12 consecutive subcarriers in the frequency domain and 6 consecutive OFDM symbols in the time domain, for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
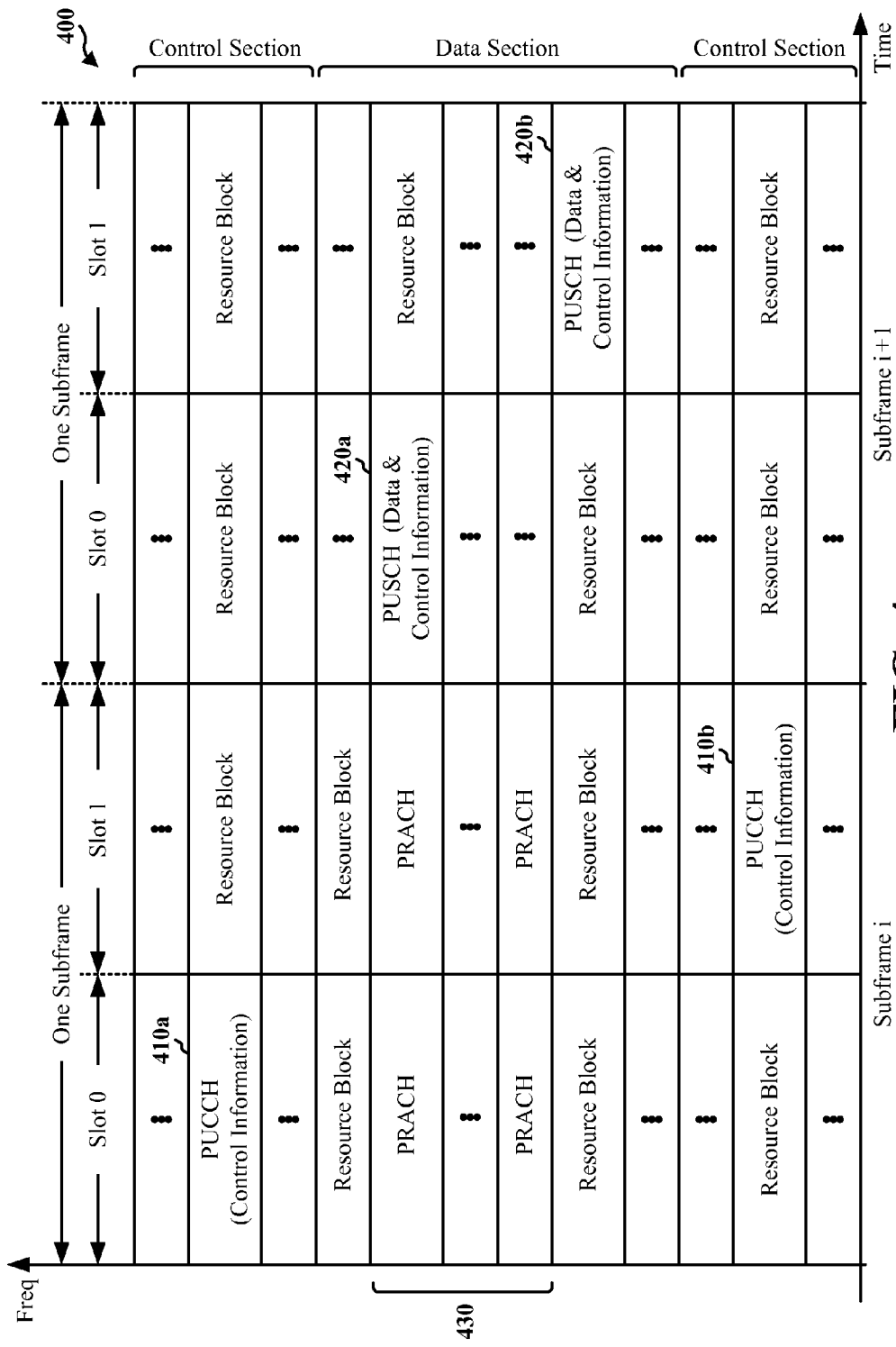
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make a single PRACH attempt per frame (10 ms).

Figure 5:
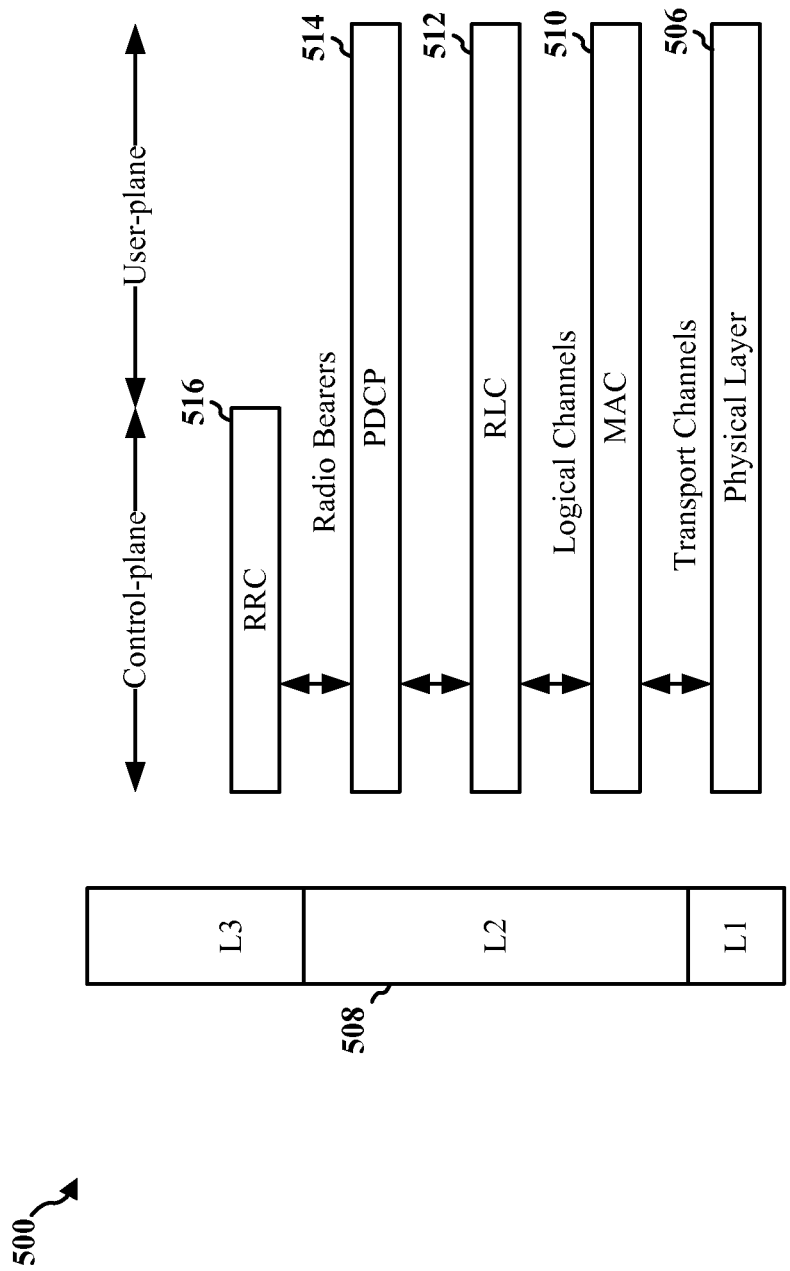
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
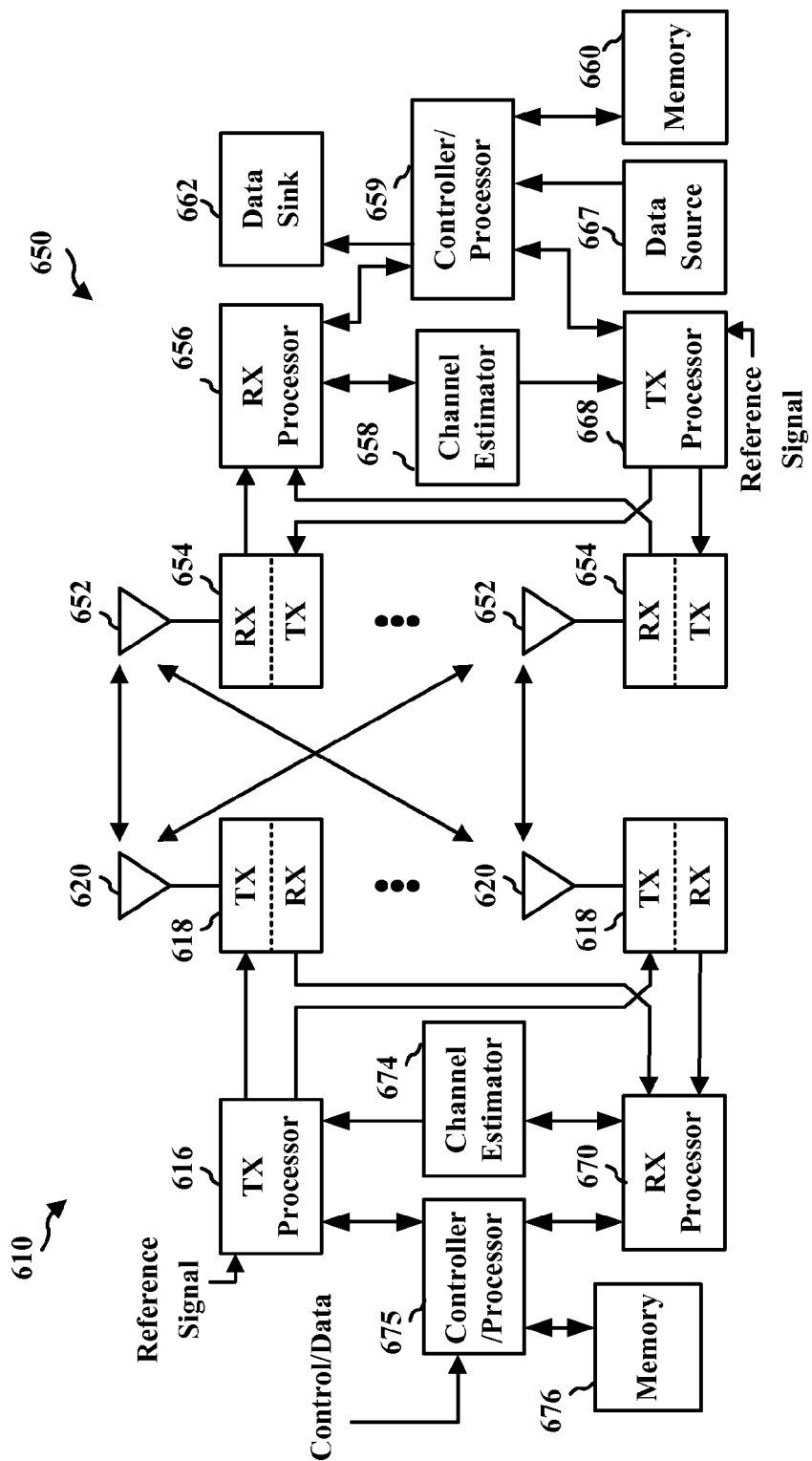
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

A cell may be dormant or may change to a dormant state (mode) to conserve power, to reduce interference to neighboring cells and/or UEs served by neighboring cells, and/or to reduce received handoffs of high mobility UEs that may be likely to experience a radio link failure (RLF) with the cell. A dormant cell may be referred to as a dormant eNB, a new carrier type (NCT) dormant eNB, or an NCT dormant cell. For an UE in an RRC-connected state, a UE measurement report may need to contain a global cell identifier (ID). An UE in an RRC idle state (e.g., an RRC-idle UE) may need to be able to access a dormant cell after receiving a page from an active cell on which the UE is camping.

Figure 7:
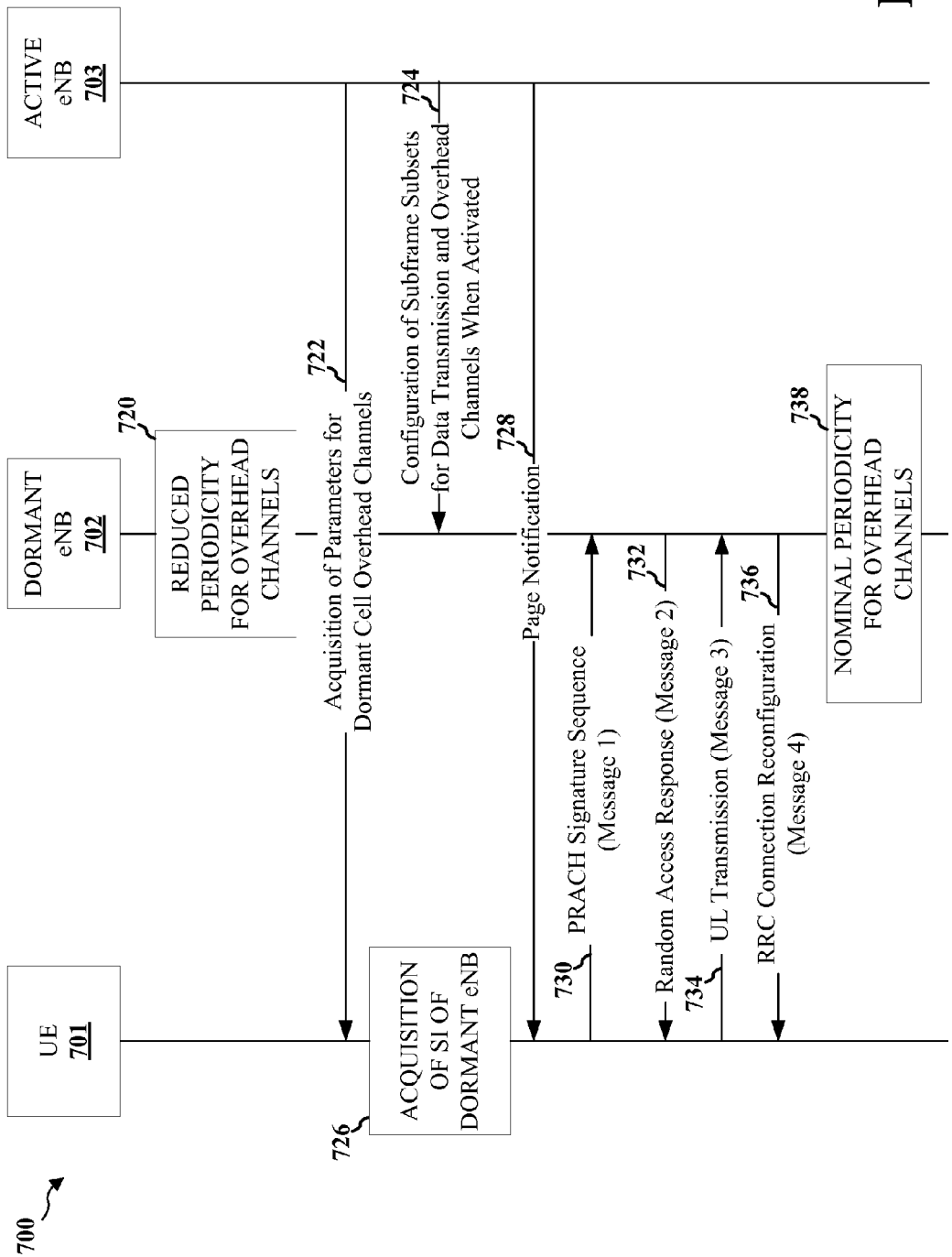
FIG. 7 is a call flow diagram illustrating the data flow between a first base station, second base station, and a UE in an exemplary embodiment.

FIG. 7 is a call flow diagram 700 illustrating an exemplary access procedure for a dormant eNB 702 by a UE 701 in communication with and camped on an active cell 703. The dormant eNB 702 transmits sparse overhead signals on overhead channels. Overhead signals include a primary synchronization signal (PSS), secondary synchronization signal (SSS), a position reference signal (PRS), a channel state information (CSI) reference signal (RS) (CSI-RS), CRS, a master information block (MIB), and system information blocks (SIBs). The dormant eNB 702 transmits the overhead signals on a small subset of subframes within each radio frame or within each of a plurality of radio frames. The sparse transmission of overhead signals contains sufficient information for allowing a UE 701 in an RRC connected state with an active eNB 703 (also referred to as a serving eNB) to detect and to measure the dormant eNB 702. The access procedure in the diagram 700 applies to RRC idle UEs that cannot camp on the dormant eNB 702.

The dormant eNB 702 sends overhead channel transmissions in bursts. The bursts are at a reduced periodicity. The dormant eNB 702 may transmit the PSS, the SSS, the PRS, the CSI-RS, the CRS, the MIB, and the system information (SI) in SI blocks (SIBs) in N ms bursts every M ms with L ms offset. The values for N, M, and L may be configured by the active eNB 703. The active eNB 703 may configure the values for N, M, and L through a broadcast in SI and/or through unicast RRC signaling. The active eNB 703 may signal the UE 701 to look at multiple burst configurations to acquire the overhead signals from the dormant eNB 702. The System Frame Number (SFN) may be synchronized with neighboring cells by, for example, over-the-air (OTA) synchronization, backhaul based synchronization, or the like. Alternatively, the dormant eNB 702 may have an SFN/subframe offset from the neighboring cells.

The dormant eNB 702 may sparsely transmit a MIB and SIBs. The dormant eNB 702 may transmit only a subset of the information that the dormant eNB 702 normally transmits when the eNB 702 is active or in an active state. For example, the dormant eNB 702 may transmit a SIB 1 (SIB1) lite, which includes only a subset of the information normally included in a SIB1. Transmitting SI sparsely (e.g., with less periodicity) reduces the coverage of discovery of the dormant eNB 702.

The system bandwidth of the dormant eNB 702 may be the same as the active eNB 703. If the system bandwidth of the dormant eNB 702 is different, the system bandwidth of the dormant eNB 702 may be communicated in the MIB. The SFN/subframe offset of the dormant eNB 702 may be the same as the active eNB 703. If the SFN/subframe offset is different for the dormant eNB 702, the active eNB 703 may signal the difference to the UE 701. The dormant eNB 702 overhead channel transmission may include an indication that the eNB 702 is dormant or in a dormant state. The indication may be transmitted in a MIB, SI (e.g., SIB1), or SIB1 lite. The indication allows the UE 701 to determine on what subframes the UE 701 can detect the dormant eNB 702.

In order for the UE 701 to access the dormant eNB 702, the dormant eNB 702 sends the UE 701 information that the UE 701 may use to access the dormant eNB 702. When the eNB 702 is in a dormant state, the dormant eNB 702 is configured to transmit overhead signals with reduce periodicity at 720. The UE 701 acquires at 722 parameters for overhead channels of the dormant eNB 702 from the active eNB 703 while continuing to monitor the paging channel from the active eNB 703. The parameters indicate the resources (e.g., subframes, periodicity) on which the overhead signals can be obtained from the dormant eNB 702. On the indicated resources, the UE 701 receives the PSS and the SSS, and detects the dormant eNB 702 based on the received PSS and the SSS. On the indicated resources, the UE 701 also receives CRS and a cell identifier associated with the dormant eNB 702. The cell identifier may be a global cell identifier or an extended cell identifier. The UE 701 determines a reference signal received quality (RSRQ), a reference signal received power (RSRP), or a signal to interference plus noise ratio (SINR) of the CRS received at the burst locations (e.g., 10 ms every 200 ms).

RRC idle UEs perform measurements of neighboring cells at the burst locations. For example, a dormant cell may transmit the overhead signal on the overhead channel for 10 ms every 200 ms. The RRC idle UEs perform cell selection and reselection procedure only on active cells. The UE 701 in an RRC idle state may read transmitted MIB/SI or SIB1 lite information on the dormant cells in order to enable direct access to dormant cells if the idle UE 701 is in coverage of the dormant cell 702. Although the idle UE 701 can acquire RACH and PRACH configuration to access the dormant eNB 702 directly, the idle UE 701 continues to camp on active eNB 703. The idle UE 701 can perform just-in-time reselection and access dormant eNB 702 in response to a page notification from the active eNB 703. In an alternative approach, the idle UE 701 may initiate the cell reselection on its own before receiving a page notification from the active eNB 703.

The active eNB 703 may communicate at 724 with the dormant eNB 702 to configure subframes that the dormant eNB 702 utilizes for data transmissions and overhead channels when activated. The UE 701 may acquire SI at 726 from the dormant eNB 702 while camped on the active eNB 703. The SI may indicate a random access configuration for performing a random access procedure or a part of a random access procedure. The information may be an explicit indication of the random access configuration or may be an implicit indication of the random access configuration. For example, the SI may include a cell identifier and the UE 701 may determine implicitly the random access configuration based on the cell identifier. Upon receiving a paging notification from the active eNB 703 at 728, the UE 701 may determine to reselect to the dormant eNB 702 from the active eNB 703. The UE 701 may make the determination to reselect based on the determined RSRP, RSRQ, and/or SINR of the received CRS or other reference signals.

The UE 701 may acquire limited SI at 726 from the dormant eNB 702 before the UE 701 initiates a random access procedure with the dormant eNB 702. The limited SI can be in a SIB1 lite and may provide enough information to the UE 701 for the UE 701 to begin the random access procedure by transmitting a PRACH signature sequence to the dormant eNB 702. The UE 701 may need to acquire more information, for example, from the active eNB 703, to complete the random access procedure. The random access procedure may be modified to convey remaining SI to the UE 701 during the random access procedure.

The random access procedure between the idle UE 701 and dormant eNB 702 includes several messages, including a message 1, random access preamble; a message 2, random access response; a message 3, L2/L3 message; and a message 4, RRC connection reconfiguration message. The UE 701 initiates the access by transmitting a message 1. Message 1 is a PRACH preamble signature sequence. After receiving the message 1 at 730 from the UE 701, the dormant eNB 702 may send a request to the active eNB 703 for activation before sending a message 2, random access response. In another example, the dormant eNB 702 may send the request for activation to an overlay macro cell before sending the message 2, random access response. The dormant eNB 702 responds to the received message 1 with a message 2, random access response at 732. The message 2 random access response may include additional SI and/or other common parameters necessary for transmission of the message 3, L2/L3 message. The UE 701 prepares the L2/L3 message based on the additional SI and/or other common parameters, and transmits the L2/L3 message to the dormant eNB 702 at 734.

The dormant eNB 702 responds at 736 with a message 4, RRC connection reconfiguration message. The dormant eNB 702 then transitions into an active mode and transmits overhead signals with a nominal periodicity, at 738. The eNB 702 transmits overhead signals in the active state with greater periodicity than when in the dormant state. After changing to the active state, the eNB 702 may indicate in the SI that the eNB 702 is in the active state rather than the dormant state. In particular, when in the active state, the eNB 702 may transmit a MIB including an active state indication, system bandwidth, and other information, such as a downlink control channel configuration, a SIB1 assignment, etc. The active state indication may include multiple bits to indicate different configurations (e.g., in terms of periodicity and/or bandwidth) of a PSS, an SSS, and reference signals, such as a PRS, a CSI-RS, a CRS, or other reference signals. The nominal periodicity may be less than a periodicity at which overhead signals are transmitted by the active eNB 703. Transmitting overhead signals at less periodicity than the active eNB 703 may be useful in order to limit the interference to UEs being served by the active eNB 703, and may be useful to reduce the handover rate of high mobility UEs that have not yet been handed over to the eNB 702. High mobility UEs may have a greater likelihood of RLF at the eNB 702. Thus, when the eNB 702 in a dormant state transitions into an active mode, data transmissions may be limited at least initially to configured subframe subsets in order to avoid creating conditions that may lead to RLF of nearby UEs. Radio Resource Management (RRM) and Radio Link Management (RLM) on the active eNB 703 may also be limited to a set of subframes or resources when the eNB 702 does not transmit signals.

A number of options exist for the dormant eNB 702 to provide sufficient information to the idle UE 701 to allow the UE 701 to begin the process of reselecting to the dormant eNB 702. The options include conveying information through SIB1 lite or using the global or enhanced cell ID to implicitly derive the information. When implicit derivation is used, the active eNB 703 may configure a mapping between the cell ID of the dormant eNB 702 and the PRACH configuration to be used with that eNB. The dormant eNB 702 may include the cell ID in the overhead data transmitted by the dormant eNB 702. The active eNB may transmit the mapping information to the UE 701.

The SIB1 lite may include only a subset of information that is normally included in a SIB1. The SIB1 lite may include cell access related information and cell selection information. The SIB1 lite may further include RACH configuration information. The SIB1 lite may include only a subset of the RACH configuration information needed to perform a random access procedure. Specifically, the SIB1 lite may include only information necessary for sending a message 1, random access preamble. When the SIB-1 lite is utilized, the RACH configuration information may be conveyed explicitly or implicitly. For implicit conveyance, the cell identity of the dormant eNB 702 may be linked to a particular RACH configuration, as discussed supra. For explicit conveyance, as discussed supra, a full RACH configuration may be conveyed or a subset of the RACH configuration may be conveyed.

Figure 8:
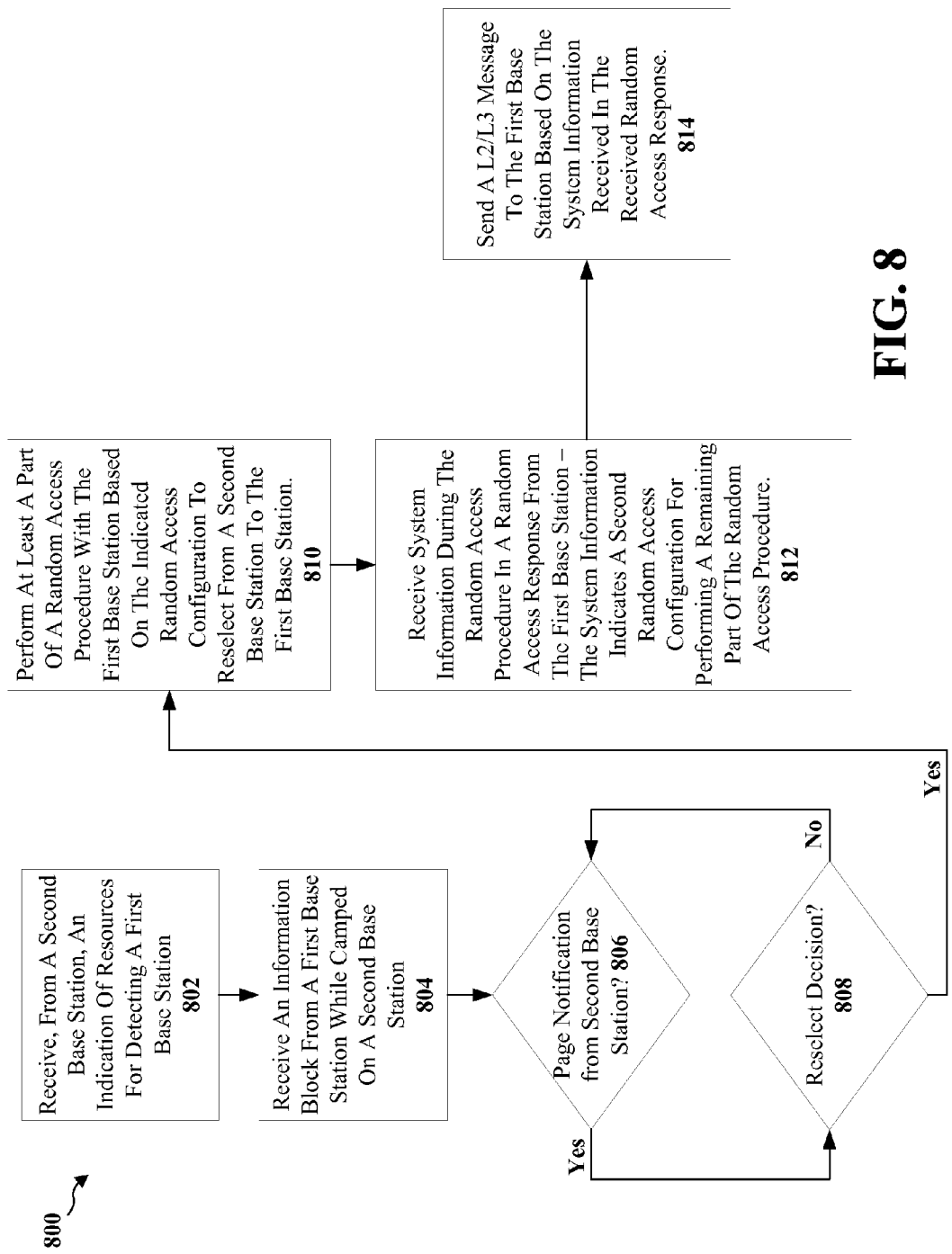
FIG. 8 is a flow diagram of a first method of wireless communication.

For example, the SIB1 lite that includes the subset of information may have a following example configuration. The UE 701 in an RRC idle state may assume the following configuration for the dormant eNB 702 on the same carrier frequency as the active eNB 703 with respect to the SIB1 content.

cellAccessRelatedInfo
        plmn-IdentityList=same as the active cell
        trackingAreaCode=same as the active cell
        cellIdentity=included in the SIB1 lite
        cellBarred=notBarred
        intraFreqReselection=allowed
        csg-Indication=false
        csg-Identity=not included in the SIB1 lite
    cellSelectionInfo
        q-RxLevMin=included in the SIB1 lite
        q-RxLevMinOffset=included in the SIB1 lite
    p-Max=not included or same as the active cell
    freqBandIndicator=same as the active cell
    schedulingInfoList=not included in the SIB1 lite
    tdd-Config=not included or same as the active cell
    si-WindowLength=not included in the SIB1 lite
    systemInfoValueTag=not included in the SIB1 lite
    nonCriticalExtension=not included in the SIB1 lite FIG. 8 is a flow diagram 800 of a method of wireless communication. The method may be performed by a UE, such as the UE 701. At 802, the UE receives, from a second base station (e.g. active eNB), an indication of resources for detecting a first base station (e.g., dormant eNB). Referring back to FIG. 7, for example, the UE 701 acquires at 722 parameters for overhead channels of the dormant eNB 702 from the active eNB 703. As discussed supra, the parameters indicate the resources (e.g., subframes, periodicity) on which the overhead signals can be obtained from the dormant eNB 702. At 804, the UE receives synchronization signals and an information block from the first base station. The information block includes an indication of a random access configuration for performing at least a part of a random access procedure. Referring back to FIG. 7, for example, the UE 701 may acquire SI at 726 from the dormant eNB 702 while camped on the active eNB 703. As discussed supra, the SI may indicate a random access configuration for performing a random access procedure or a part of a random access procedure.

At 806, the UE determines if a paging notification is received from the second base station. If a paging notification is received, at step 808, the UE determines whether to reselect to the first base station. Referring back to FIG. 7, for example, upon receiving a paging notification from the active eNB 703 at 728, the UE 701 may determine to reselect to the dormant eNB 702 from the active eNB 703. If the UE determines not to reselect, the UE stays with the second base station. If the UE determines to reselect, at 810, the UE performs at least a part of a random access procedure with the first base station based on the indicated random access configuration to reselect from a second base station to the first base station. At 812, the UE receives system information during the random access procedure in a random access response from the first base station, the system information indicating a second random access configuration for performing a remaining part of the random access procedure. Referring back to FIG. 7, for example, during the random access procedure between the idle UE 701 and dormant eNB 702, after receiving the message 1 at 730 from the UE 701, the dormant eNB 702 may send a request to the active eNB 703 for activation before sending a message 2, random access response. As discussed supra, for example, the dormant eNB 702 responds to the received message 1 with a message 2, random access response at 732. As discussed supra, for example, the message 2, random access response may include additional SI and/or other common parameters necessary for transmission of the message 3, L2/L3 message.

At 814, the UE sends an L2/L3 message to the first base station based on the system information received in the received random access response. As discussed supra, for example, the UE 701 prepares the L2/L3 message based on the additional SI and/or other common parameters, and transmits the L2/L3 message to the dormant eNB 702 at 734.

The information block received by the UE may include a cell identifier of the first base station. The indication of the random access configuration may be the cell identifier. In such a configuration, the UE determines the random access configuration based on the cell identifier. For example, as discussed supra, the SI acquired from the dormant eNB 702 may include a cell identifier and the UE 701 may determine implicitly the random access configuration based on the cell identifier. The information block may be a MIB or a SIB. The information block may be a SIB1. The information block may include a subset of a SIB1 and therefore may be a SIB1 lite. For example, as discussed supra, the overhead signals transmitted from the dormant eNB 702 over the overhead channel may include a MIB, SIB1, or SIB1 lite.

Figure 9:
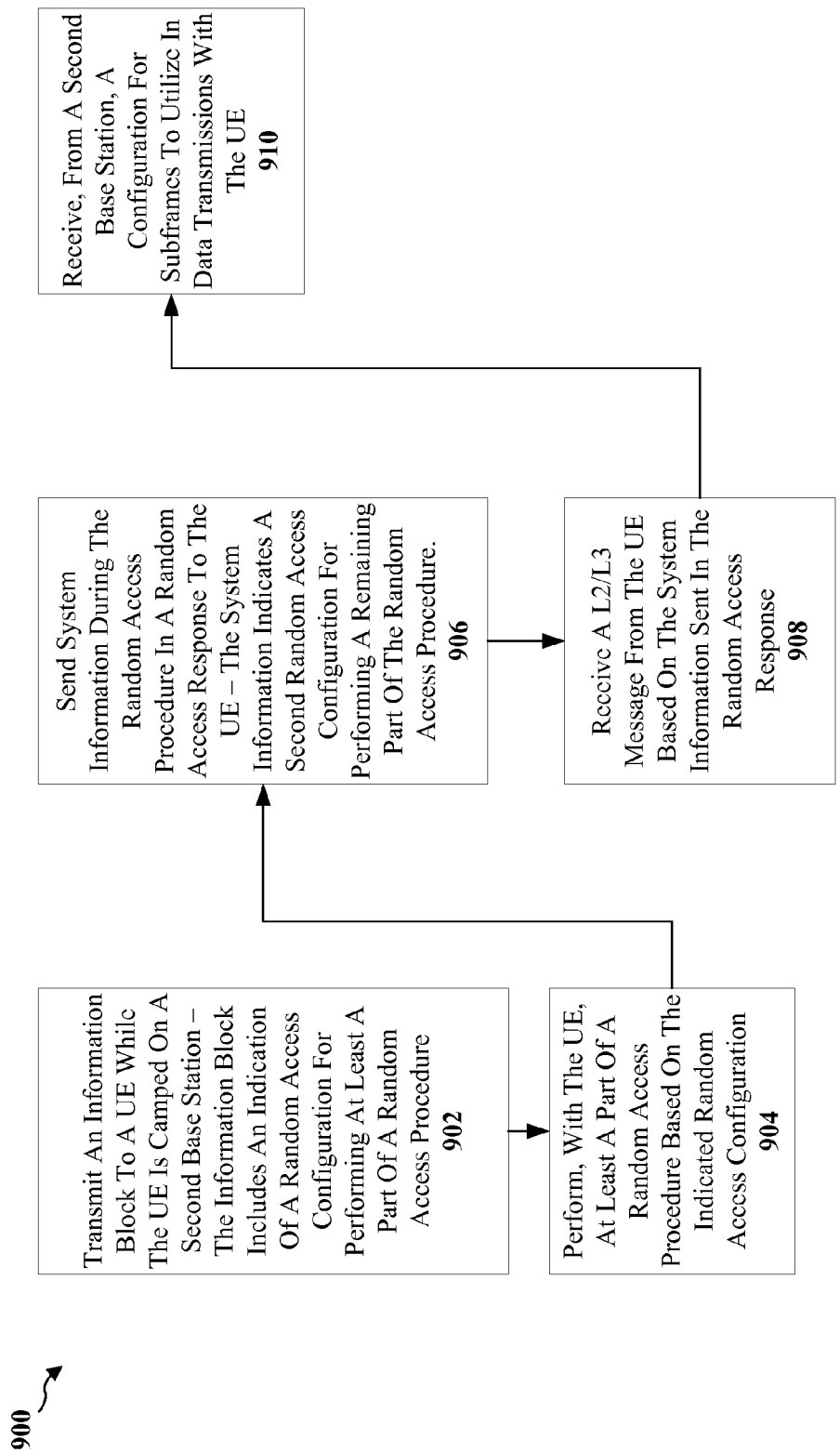
FIG. 9 is a flow diagram of a second method of wireless communication.

FIG. 9 is a flow diagram 900 illustrating a method of wireless communication. The method may be performed by a first base station (e.g., dormant eNB). At 902, the first base station transmits an information block to a UE while the UE is camped on a second base station. The information block includes an indication of a random access configuration for performing at least a part of a random access procedure. Referring back to FIG. 7, for example, the UE 701 may acquire SI at 726 from the dormant eNB 702 while camped on the active eNB 703. As discussed supra, the SI may indicate a random access configuration for performing a random access procedure or a part of a random access procedure.

At 904, the first base station performs, with the UE, at least a part of a random access procedure based on the indicated random access configuration. At 906, the first base station sends system information during the random access procedure in a random access response to the UE. The system information indicates a second random access configuration for performing a remaining part of the random access procedure. At 908, the first base station receives a L2/L3 message from the UE based on the system information sent in the random access response. Referring back to FIG. 7, for example, during the random access procedure between the idle UE 701 and dormant eNB 702, after receiving the message 1 at 730 from the UE 701, the dormant eNB 702 may send a request to the active eNB 703 for activation before sending a message 2, random access response. As discussed supra, for example, the dormant eNB 702 responds to the received message 1 with a message 2, random access response at 732. As discussed supra, for example, the message 2 random access response may include additional SI and/or other common parameters necessary for transmission of the message 3, L2/L3 message. As discussed supra, for example, the UE 701 prepares the L2/L3 message based on the additional SI and/or other common parameters, and transmits the L2/L3 message to the dormant eNB 702 at 734. At 910, the first base station may receive, from the second base station, a configuration for subframes to utilize in data transmissions with the UE. Referring back to FIG. 7, for example, the dormant eNB 702 responds at 736 with a message 4, RRC connection reconfiguration message. As discussed supra, for example, the dormant eNB 702 then transitions into an active mode and transmits overhead signals with a nominal periodicity, at 738.

The information block sent by the first base station may include a cell identifier of the first base station. The indication of the random access configuration may be indicated by the cell identifier. In such a configuration, the UE determines the random access configuration based on the cell identifier. For example, as discussed supra, the SI acquired from the dormant eNB 702 may include a cell identifier and the UE 701 may determine implicitly the random access configuration based on the cell identifier. The information block may be a MIB or a SIB. The information block may be a SIB1. The information block may include a subset of a SIB1 and therefore may be a SIB1 lite. For example, as discussed supra, the overhead signals transmitted from the dormant eNB 702 over the overhead channel may include a MIB, SIB1, or SIB1 lite.

Figure 10:
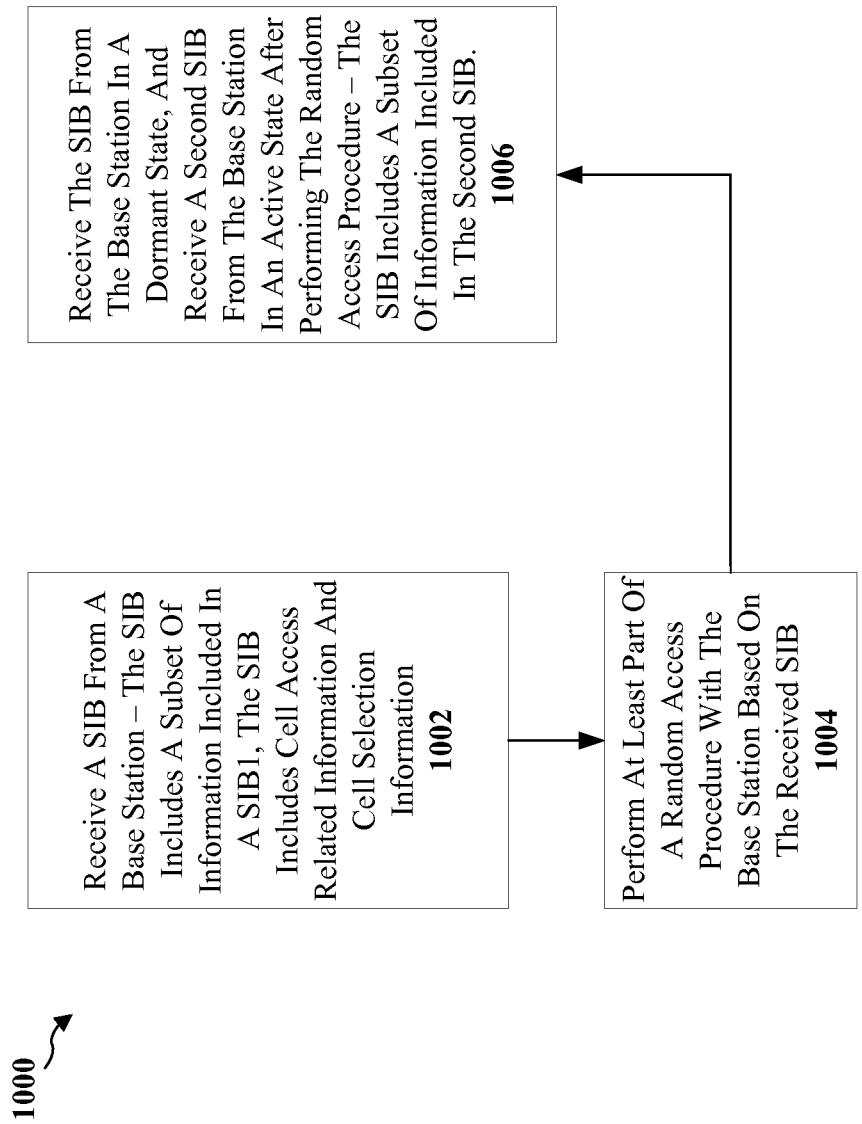
FIG. 10 is a flow diagram of a third method of wireless communication.

FIG. 10 is a flow diagram 1000 of a method of wireless communication. The method may be performed by a UE, such as the UE 701. At 1002, the UE receives a SIB from a base station. The SIB includes a subset of information included in a SIB1. The SIB includes cell access related information and cell selection information. At 1004, the UE performs at least part of a random access procedure with the base station based on the received SIB. Referring back to FIG. 7, for example, the UE 701 may acquire limited SI at 726 from the dormant eNB 702 before the UE 701 initiates a random access procedure with the dormant eNB 702. As discussed supra, for example, the limited SI can be in a SIB1 lite and may provide enough information to the UE 701 for the UE 701 to begin the random access procedure by transmitting a PRACH signature sequence to the dormant eNB 702. As discussed supra, for example, the SIB1 lite may include only a subset of information that is normally included in a SIB1, and may include cell access related information and cell selection information.

At 1006, the UE receives the SIB from the base station when the base station is in a dormant state, and receives a second SIB from the base station when the base station is in an active state after performing the random access procedure. The SIB includes a subset of information included in the second SIB. The first SIB received by the UE may be with a first periodicity and the second SIB may be received with a second periodicity greater than the first periodicity. For example, as discussed supra, the UE 701 may need to acquire more information from the active eNB 703, to complete the random access procedure. As discussed supra, for example, the random access procedure may be modified to convey remaining SI to the UE 701 during the random access procedure.

Figure 11:
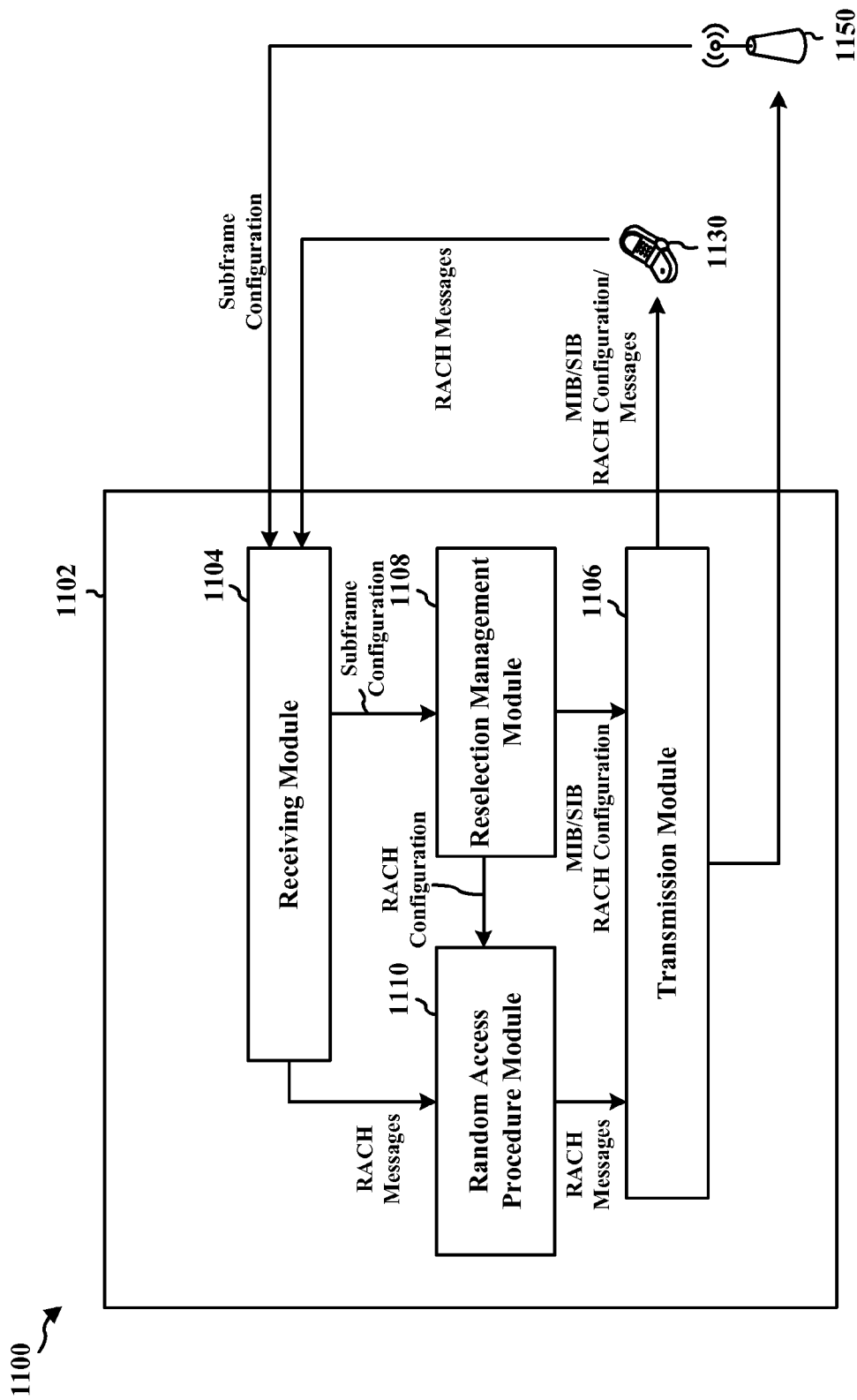
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a first base station. The apparatus includes, among other things, a receiving module 1104, a random access procedure module 1110, a reselection management module 1108, and a transmission module 1106.

In certain configurations, the reselection management module 1108 may be configured to transmit an information block to a UE 1130 while the UE 1130 is camped on a second base station 1150. The information block includes an indication of a random access configuration for performing at least a part of a random access procedure. The random access procedure module 1110 may be configured to perform, with the UE 1130, at least a part of a random access procedure based on the indicated random access configuration.

In certain configurations, the information block may include a cell identifier. The random access procedure may be indicated by the cell identifier. In certain configurations, the information block may be a MIB. In certain configurations, the information block may be a SIB. In certain configurations, the information block may be a SIB 1 (SIB1). In certain configurations, the information block may be a subset of the SIB 1 (SIB1).

In certain configurations, the random access procedure module 1110 may be configured to send system information during the random access procedure. In certain configurations, the system information may be sent in a random access response to the UE 1130. The system information indicates a second random access configuration for performing a remaining part of the random access procedure. In certain configurations, the random access procedure module 1110 may be configured to receive an L2/L3 message from the UE 1130 based on the system information sent in the random access response. In certain configurations, the reselection management module 1108 may be configured to receive, from a second base station 1150, a configuration for subframes to utilize in data transmissions with the UE 1130.

The apparatus may include additional modules that perform each of the blocks of the algorithm in the aforementioned flowchart of FIG. 9. As such, each block in the aforementioned flowchart of FIG. 9 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
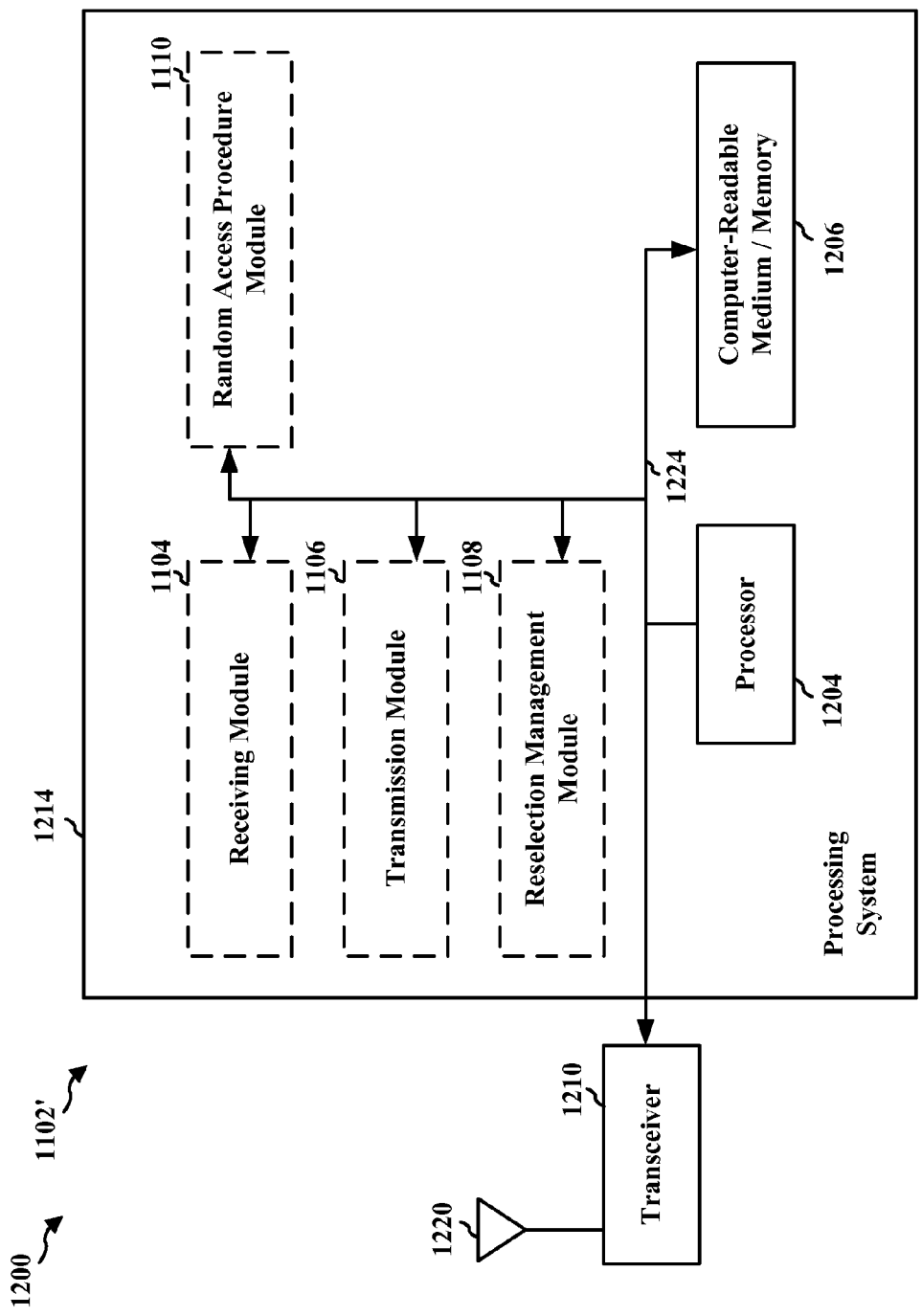
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmission module 1106, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, and 1110. The modules may be software modules running in the processor 1204, resident/stored in the computer readable medium/memory 1206, one or more hardware modules coupled to the processor 1204, or some combination thereof. The processing system 1214 may be a component of the eNB 610 and may include the memory 676 and/or at least one of the TX processor 616, the RX processor 670, and the controller/processor 675.

In certain configurations, the apparatus 1102/1102' may be a first base station. The apparatus 1102/1102' may include means for transmitting an information block to a UE while the UE is camped on a second base station. The information block includes an indication of a random access configuration for performing at least a part of a random access procedure. The apparatus 1102/1102' may include means for performing, with the UE, at least a part of a random access procedure based on the indicated random access configuration.

In certain configurations, the information block may include a cell identifier. The random access procedure may be indicated by the cell identifier. In certain configurations, the information block may be a MIB. In certain configurations, the information block may be a SIB. In certain configurations, the information block may be a SIB 1 (SIB1). In certain configurations, the information block may be a subset of the SIB 1 (SIB1).

In certain configurations, the apparatus 1102/1102' may include means for sending system information during the random access procedure. In certain configurations, the system information may be sent in a random access response to the UE, the system information indicating a second random access configuration for performing a remaining part of the random access procedure.

In certain configurations, the apparatus 1102/1102' may include means for receiving an L2/L3 message from the UE based on the system information sent in the random access response. In certain configurations, the apparatus 1102/1102' may include means for receiving, from a second base station, a configuration for subframes to utilize in data transmissions with the UE.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication of a first base station, comprising:
    transmitting an information block to a user equipment (UE) while the UE is camped on a second base station, the information block comprising an indication of a random access configuration for performing at least a part of a random access procedure;
    performing, with the UE, at least a part of a random access procedure based on the indicated random access configuration; and
    transmitting system information during the random access procedure in a random access response to the UE, the system information indicating a second random access configuration for performing a remaining part of the random access procedure.

2. The method of claim 1, wherein the information block comprises a cell identifier, the random access procedure being indicated by the cell identifier.

3. The method of claim 1, wherein the information block is a master information block (MIB).

4. The method of claim 1, wherein the information block is a system information block (SIB).

5. The method of claim 4, wherein the information block is a SIB 1 (SIB1).

6. The method of claim 4, wherein the information block is a subset of a SIB 1 (SIB1).

7. The method of claim 1, further comprising receiving a layer 2 (L2)/layer 3 (L3) (L2/L3) message from the UE based on the system information sent in the random access response.

8. The method of claim 1, further comprising receiving, from a second base station, a configuration for subframes to utilize in data transmissions with the UE.

9. An apparatus for wireless communication, the apparatus being a first base station, comprising:
    means for transmitting an information block to a user equipment (UE) while the UE is camped on a second base station, the information block comprising an indication of a random access configuration for performing at least a part of a random access procedure;
    means for performing, with the UE, at least a part of a random access procedure based on the indicated random access configuration; and
    means for transmitting system information during the random access procedure in a random access response to the UE, the system information indicating a second random access configuration for performing a remaining part of the random access procedure.

10. The apparatus of claim 9, wherein the information block comprises a cell identifier, the random access procedure being indicated by the cell identifier.

11. The apparatus of claim 9, wherein the information block is a master information block (MIB).

12. The apparatus of claim 9, wherein the information block is a system information block (SIB).

13. The apparatus of claim 12, wherein the information block is a SIB 1 (SIB1).

14. The apparatus of claim 12, wherein the information block is a subset of a SIB 1 (SIB1).

15. The apparatus of claim 9, further comprising means for receiving a layer 2 (L2)/layer 3 (L3) (L2/L3) message from the UE based on the system information sent in the random access response.

16. The apparatus of claim 9, further comprising means for receiving, from a second base station, a configuration for subframes to utilize in data transmissions with the UE.

17. An apparatus for wireless communication, the apparatus being a first base station, comprising:
    a memory; and
    at least one processor coupled to the memory and configured to:

transmit an information block to a user equipment (UE) while the UE is camped on a second base station, the information block comprising an indication of a random access configuration for performing at least a part of a random access procedure;

perform, with the UE, at least a part of a random access procedure based on the indicated random access configuration; and transmit system information during the random access procedure in a random access response to the UE, the system information indicating a second random access configuration for performing a remaining part of the random access procedure.

18. The apparatus of claim 17, wherein the information block comprises a cell identifier, the random access procedure being indicated by the cell identifier.

19. The apparatus of claim 17, wherein the information block is a master information block (MIB).

20. The apparatus of claim 17, wherein the information block is a system information block (SIB).

21. The apparatus of claim 20, wherein the information block is a SIB 1 (SIB1) or a subset of the SIB 1 (SIB1).

22. The apparatus of claim 17, wherein the at least one processor is further configured to receive a layer 2 (L2)/layer 3 (L3) (L2/L3) message from the UE based on the system information sent in the random access response.

23. The apparatus of claim 17, wherein the at least one processor is further configured to receive, from a second base station, a configuration for subframes to utilize in data transmissions with the UE.

24. A non-transitory computer-readable medium for a first base station and storing computer executable code for wireless communication, comprising code for:

transmitting an information block to a user equipment (UE) while the UE is camped on a second base station, the information block comprising an indication of a random access configuration for performing at least a part of a random access procedure;

performing, with the UE, at least a part of a random access procedure based on the indicated random access configuration; and transmitting system information during the random access procedure in a random access response to the UE, the system information indicating a second random access configuration for performing a remaining part of the random access procedure.

* * * * *